United States Patent [19]

Miller et al.

[11] Patent Number: 4,930,451
[45] Date of Patent: Jun. 5, 1990

[54] DEVICE FOR SUSTAINED-RELEASE OF A CHEMICAL ONTO AN ANIMAL AND METHOD OF USING THE DEVICE

[75] Inventors: John A. Miller; Delbert D. Oehler, both of Kerrville, Tex.

[73] Assignee: The United States of America as represented by the Secretary of Agriculture, Washington, D.C.

[21] Appl. No.: 226,057

[22] Filed: Jul. 29, 1988

[51] Int. Cl.$^5$ ..................... A01K 27/00; A01K 13/00
[52] U.S. Cl. ................................. 119/106; 119/156
[58] Field of Search ..................... 119/106, 157, 156; 239/36, 43, 44

[56] References Cited

U.S. PATENT DOCUMENTS

| | | | |
|---|---|---|---|
| 3,169,705 | 2/1965 | Geiger | 239/43 |
| 3,213,830 | 10/1965 | Wiesemann | 119/106 |
| 3,814,061 | 6/1974 | Aries et al. | 119/106 |
| 3,935,839 | 2/1976 | Goodwin | 119/156 |
| 4,047,505 | 9/1977 | McAndless | 119/106 |
| 4,562,794 | 1/1986 | Speckman | 119/156 |

FOREIGN PATENT DOCUMENTS 2400839  4/1979  France ................ 119/106

OTHER PUBLICATIONS

S. M. Herbig et al., "A Membrane-Based Cattle Insecticide Eartag," *Proceed. Intern. Symp. Control Rel. Bioact. Mater.,* Aug. 2-5, 1987.
J. A. Miller et al., "Sustained-Release Systems for Control of Ectoparasites on Cattle," *Proceed. Intern. Symp. Control R.B.M.,* Aug. 1987.
E. H. Ahrens, "Horn Fly Control with an Insecticide-Impregnated Ear Tag," *The Southwestern Entomologist,* Mar. 1977, pp. 8-10.
J. A. Miller et al., "Release of Pyrethroids from Insecticidal Ear Tags," *J. of Economic Entomology,* Dec. 1983, pp. 1335-1340.
W. J. Gladney, "Field Trials of Insecticides . . . Screwworm in Cattle," *J. of Economic Entomology,* Dec. 1976, pp. 757-760.
E. H. Ahrens et al., "Season Long Horn Fly Control with an Insecticide-Impregnated Ear Tag," *J. Econ. Entomology,* 1979, p. 215.
R. E. Williams et al., "Evaluation of Pyrethroids . . . Control of Face Flies and Horn Flies," *J. Econ. Entomology,* vol. 73, 1980, pp. 791, 792.
F. W. Knapp et al., "Face Fly and Horn Fly Reduction on Cattle with Fenvalerate Ear Tags," *J. Econ. Entomol.,* 1981, pp. 295, 296.
C. D. Schmidt et al., "Fenvalerate and Stirofos Ear Tags for Control of Horn Flies on Range Cattle," *The Southwestern Entomol.,* 12/80, pp. 202-206.
C. D. Schmidt et al., "Resistance of Horn Flies (Diptera:Muscidae) to Permethrin and Fernvalerate," *J. Econ Entomol.,* Apr. 1985, pp. 402-406.
G. P. Georghiou, "Management of Resistance in Arthropods," *Pest Resistance to Pesticides,* Plenum Pub. Corp., 1983, pp. 769-792.
D. C. Sheppard, "Fenvalerate and Flucythrinate Resistance in a Horn Fly Population," *J. Agric. Entomol.,* Jul. 1984, pp. 305-310.
S. S. Quisenberry et al., "Pyrethroid Resistance in the Horn Fly, Haematobia irritans (L)(Dipt.:Musci.)," *J. Econ. Entomol.,* 10/84, pp. 1095-1098.
H. J. Schnitzerling et al., "Resistance of the Buffalo Fly . . . Pyrethroids and DDT," *J. Aust. Entomol. Soc.,* 1982, 21, pp. 77-80.

*Primary Examiner*—Robert P. Swiatek
*Attorney, Agent, or Firm*—Finnegan, Henderson, Farabow, Garrett & Dunner

[57] ABSTRACT

A device for the controlled, sustained-release of an animal-treating composition, such as an insecticide, onto the surface of an animal in contact with the device comprises a reservoir defined by a permeable, imperforate, polymeric membrane. A porous packing inside the reservoir continuously wets the inside of the reservoir with the animal-treating composition so that the composition can continuously permeate through the membrane to the outer surface of the reservoir. A porous sheath in contact with the outer surface of the reservoir continuously conducts the composition away from the membrane and continuously deposits the composition onto the surface of the animal. The device is particularly useful for controlling horn flies on range animals, such as cattle.

12 Claims, 3 Drawing Sheets

DEVICE FOR SUSTAINED-RELEASE OF A CHEMICAL ONTO AN ANIMAL AND METHOD OF USING THE DEVICE

BACKGROUND OF THE INVENTION

This invention relates to a device and method for the sustained release of a chemical onto an animal. More particularly, this invention relates to a device for the sustained release of a chemical contained within the device and to the use of the device on animals for the control of insects, parasites and pests susceptible to the chemical.

Several types of pests afflict range animals, especially herds of cattle, and can cause substantial economic loss to farmers and ranchers. Among these pests are horn flies, *Haematobia irritans* (L.); face flies, *Musca autumnalis* De Geer; the Gulf Coast tick, *Amblyomma maculatum* Koch; the screwworm, *Cochliomyia hominivorax* (Coquerel); and the southern cattle tick, *Boophilus microplus* (Canestrini).

In order to control these insects and pests, it is customary to treat animals by spraying the hair coats of the animals with an insecticide solution. This type of treatment provides protection against the pests for a period of about three weeks. Beyond this period of time, the insecticide treatment is usually ineffective because the insecticide was degraded by light and microorganisms. In addition, the use of relatively large amounts of the insecticide is necessitated by the need to spray the entire surface of the animal and to compensate for the gradual deterioration of the insecticide following application to the animal. These disadvantages led to the development of alternative insecticide delivery systems, such as insecticidal ear tags for animals.

Insecticidal ear tags have recently become a valuable tool for the control of livestock pests. The ear tags release an insecticide, which is spread when the animal causes the tag to rub its hair coat or the hair coat of other animals. Ear tag effectiveness has been well documented by researchers across the United States. The insecticidal ear tags are commonly referred to as controlled-release, sustained-release, or slow-release devices. The pesticide, formulated in a monolithic polymer matrix, typically polyvinylchloride, is slowly released from the matrix over a prolonged period and deposited on the hair coat of cattle. The insecticidal ear tag was rapidly accepted by the producer. In contrast to the 2-3-week intervals between spraying of cattle with liquid sprays, the rancher cold use an insecticidal ear tag to treat his cattle with a device similar to the familiar numbered identification tags and expect season-long control in most parts of the U.S.

Although originally developed for control of Gulf Coast ear ticks, the insecticidal ear tag has found greatest use in the control of the horn fly, a much more serious pest of cattle. E. H. Ahrens, Horn fly control with an insecticide-impregnated ear tag, Southwest. Entomol., 2 (1977) 8-10. E. H. Ahrens and J. Cocke, Season long horn fly control with an insecticide-impregnated ear tag, J. Econ. Entomol., 72 (1979) 215. The first commercially available tags contained an organophosphate, either stirofos or chlorpyrifos, and provided 6-10 weeks control of horn flies on cattle. Soon thereafter, tags containing pyrethroids were introduced and were shown to be capable of controlling horn flies for 16-24 weeks. R. E. Williams and E. J. Westby, Evaluation of pyrethroids impreganated in cattle ear tags for control of face flies and horn flies, J. Econ. Entomol. 73 (1980) 791-792. C.D. Schmidt and S. E. Kunz, Fenvalerate and stirofos ear tags for control of horn flies on range cattle, Southwest. Entomol. 5 (1980) 202-206. F. W. Knapp and F. Herald, Face fly and horn fly reduction on cattle with fenvalerate ear tags, J. Econ. Entomol., 74 (1981) 295-296.

Because of the wide spread use of the insecticidal ear tag, horn fly populations, particularly in the southern U.S., were subjected to greater selection pressure by a single class of insecticides than perhaps ever before. In addition, the long-lasting effectiveness of the insecticidal tag treatment meant that multiple generations were exposed to the highly selective dosages. Consequently, horn flies developed significant resistance to the pyrethroids in as little as 2-3 years after introduction of the tags. H. J. Schnitzerling, P. J. Noble, A. Macqueen, and R. J. Dunham, Resistance of buffalo fly, Haematobia irritans exiqua (de Meijere), to two synthetic pyrethroids and DDT, J. Australian Entomol. Soc. 21 (1982) 77-80. D. C. Sheppard, Fenvalerate and flucythrinate resistance in a horn fly population, J. Agric. Entomol. 1 (1984) 305-310. S. S. Quisenberry, J. A. Lockwood, R. L. Byford, H. K. Wilson and T. C. Sparks, Pyrethroid resistance in the horn fly, Haematobia irritans (L.), J. Econ. Entomol. 77 (1984) 1095-1098. C. D. Schmidt, S. E. Kunz, H. D. Petersen and J. L. Robertson, Resistance of horn flies to permethrin and fenvalerate, J. Econ. Entomol., 78 (1985) 402-406.

One method of managing resistance is to change to a class of insecticides that has a different mode of action against the pest. George P. Georghiou, Management of resistance in arthropods, in: George P. Georghiou and Tetsuo Saito (Eds.), Pest Resistance to Pesticides, Plenum Publishing Corporation, New York, 1983, pp. 769-792. Since cross-resistance has been shown between the chlorinated hydrocarbons and pyrethroids, the organophosphates (OP's) appear to be the class of choice for applying this resistance management strategy to the horn fly. However, the organophosphates are generally less toxic and tend to degrade more rapidly in the environment. For horn fly control, OP's must be applied at higher dosages and more frequently than pyrethroids. This means that a controlled-release delivery system for the OP's will have to deliver greater quantities of the insecticide than was necessary with the pyrethroids.

Most currently available ear tags are of a monolithic structure, and the release rate of insecticide decreases with time. In addition, only relatively small amounts of insecticide can be loaded into monolithic ear tags without compromising the strength of the polymer matrix. The decreasing release rate and limited loading restrict the duration of efficacy to about 2 to 4 months. As efficacy declines, the ear tag continues to release insecticide, but at sub-lethal doses. It has been reported that more than 50% of the insecticide loaded into monolithic ear tags is still in the ear tags after the ear tags lose their effectiveness. This is not only an inefficient use of the insecticides, but increases the likelihood that fly populations will develop resistance as a result of prolonged exposure to sub-lethal doses of the insecticides.

Thus, there exists a need in the art for a delivery system for insecticide compositions, such as OP's, in which the release rate is sustainable and controllable. The delivery system should be capable of providing relatively high loadings of the insecticide composition.

Ideally, the delivery system should be capable of delivering the composition at a level necessary for control of pests for durations equal to the pyrethroid ear tag. In addition, the delivery system should have a predictable and reproducible release rate profile so that the release rate will not decline to such a level that sub-lethal doses of the insecticide composition are released for substantial periods of time.

SUMMARY OF THE INVENTION

This invention aids in fulfilling these needs in the art. More particularly, this invention provides a device for the controlled, sustained-release of an animal-treating composition onto a surface in contact with the device. The device comprises reservoir means having an inside surface and an outside surface. The reservoir means is comprised of a permeable, imperforate, polymeric membrane. A porous packing means in the reservoir continuously wets the inside surface of the reservoir with the animal-treating composition so that the composition can continuously permeate through the membrane to the outer surface of the reservoir. A porous sheath means is in contact with the outer surface of the reservoir for continuously conducting away, by capillary action, the composition that permeates through the membrane to the outer surface of the reservoir. The sheath means also continuously deposits the composition onto the surface.

This invention also provides a method of using the device of the invention to deposit an active ingredient in the animal-treating composition onto the surface of an animal. More particularly, the device of the invention is attached to an animal, such as in the form of a neck band, and the active ingredient is deposited on the animal by maintaining a concentration gradient from inner surface to the outer surface of the membrane. Active ingredient is removed from the outer surface of the membrane by contact with the animal coat.

BRIEF DESCRIPTION OF THE DRAWINGS

This invention will be described in greater detail by reference to the drawings, which relate to liquid permeable reservoirs of the type described in Example 1 and Example 2, infra, and in which.

DETAILED DESCRIPTION OF PREFERRED EMBODIMENTS

The release rate profile from insecticidal ear tags was characterized and was found to conform to the first-order model. J. A. Miller, D. D.. Oehler, and S. E. Kunz, Release of pyrethroids from insecticidal ear tags, J. Econ. Entomol., 76 (1983) 1335–1340. Because of size and weight constraints on ear tags, it was apparent that it would be difficult to formulate an ear tag that was capable of delivering available OP's at the level necessary for control of the horn fly for durations equal to the pyrethroid ear tag. Thus, a delivery system for the prolonged, sustained release of high loadings of insecticides was developed.

Figure 1:
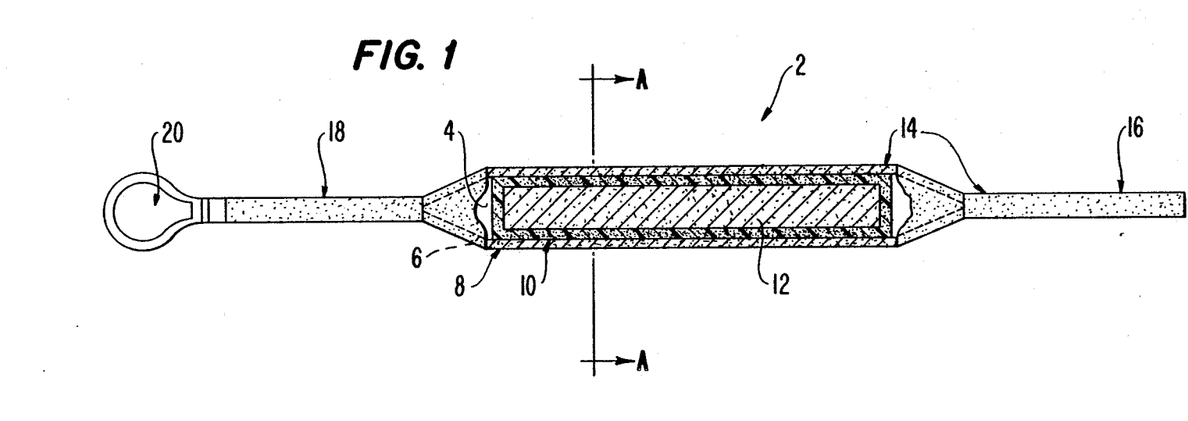
FIG. 1 is a cross-sectional view of a device of the invention for the sustained release of an insecticide to the hair coat of cattle.

FIG. 1 shows a device of the invention for the controlled, sustained release of an animal-treating composition onto a surface in contact with the device. Referring to FIG. 1, the device 2 is comprised of a reservoir 4 having an inside surface 6 and an outside surface 8. The reservoir 4 is defined by a permeable, imperforate, polymeric membrane 10. The reservoir 4 is filled with the animal-treating composition (not shown). A porous packing material 12 in the reservoir 4 continously wets the inside surface 6 of the reservoir so that the composition is capable of continuously permeating through the polymeric membrane 10 to- the outer surface 8 of the reservoir.

A porous sheath 14 is provided over the reservoir 4. The sheath 14 is in contact with the outer surface 8 of the reservoir 4 and continuously conducts the animal-treating composition away from the outer surface. The material that is conducted away is the composition that permeates through the polymeric membrane 10 to the outer surface 8. The porous sheath 14 then continuously deposits the material onto the surface being treated.

As shown in FIG. 1, the porous sheath 14 of the device 2 tapers at one end to form an elongated tab 16. The porous sheath 14 also tapers at the other end to form an elongated tab 18 which terminates in an attachment loop 20.

Figure 2:
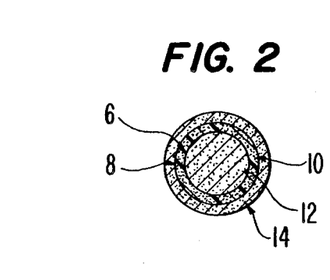
FIG. 2 is a view through section A—A of the device shown in FIG. 1.
Figure 3:
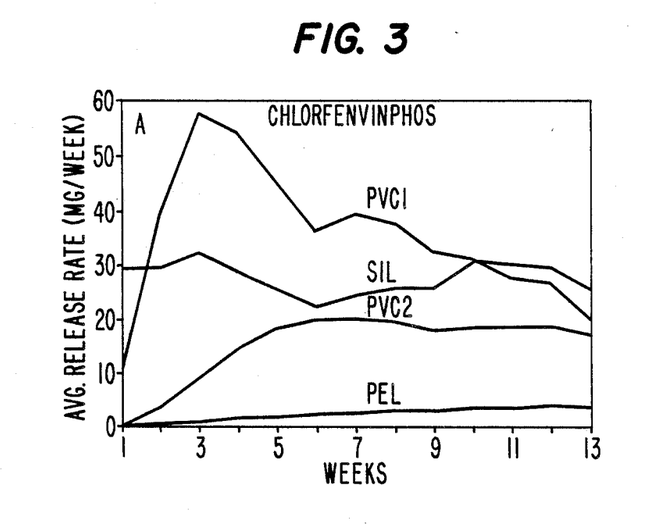
FIG. 3 depicts the release rate of chlorfenvinphos from reservoirs of four different compositions.

FIG. 2 is a cross-section of the device 2 through Section A—A in FIG. 1. The porous sheath 14 surrounds the polymeric membrane 10 and is in contact with the outer surface 8 of the reservoir 4. The reservoir is filled with the porous packing material 12, which contacts the inner surface 6 of the reservoir to wet the surface so that the animal-treating composition is capable of continuously permeating through the membrane 10 to the outer surface 8 and onto the porous sheath 14.

The device depicted in FIGS. 1 and 2 is used by wrapping the device around the neck of an animal, such as cattle, then passing the elongated tab 16 through the attachment loop 20 and securing the tab in position, such as by means of a knot. The device fits loosely around the neck of the animal so that the device can move over the entire neck surface. The composition in the reservoir continuously permeates through the polymeric membrane onto the porous sheath 14 and is distributed over the surface of the animal's neck by the movement of the device 2. This results in the composition being distributed over a larger surface area than would otherwise be possible if the device was snugly fitted to the neck of the animal.

The device of this invention is suitable for the delivery of an animal-treating composition from a storage reservoir onto the surface of an animal over an extended period of time, generally a period of at least about 120 days. Preferably, the delivery period is about 120 to about 160 days, which corresponds to the seasonal period during which insects and parasites, especially horn flies, inflict damage on livestock.

The device of this invention capable of delivering an animal-treating composition onto the surface of an animal over a prolonged period of time. Specifically, delivery of the composition from the reservoir onto the surface of the animal is dependent upon maintenance of a concentration gradient between the contents of the reservoir and the concentration of the composition at the interface of the sheath and the outer surface of the reservoir. Thus, as long as the concentration gradient is sufficient to provide the driving force for diffusion of the composition from the reservoir to the surface, the delivery of material from the reservoir will be substantially continuous. When, however, the concentration gradient is reduced, the delivery of the composition from the reservoir will also be reduced. Thus, while the device of this invention is capable of continuously delivering material from the reservoir to the surface of the animal, the device need not function in this manner.

Maintenance of a concentration gradient provides a mode of operation which also makes it possible to deliver the animal-treating composition to the surface of the animal at a constant release rate or at a variable release rate. For example, the concentration gradient between the contents of the reservoir and the outer surface of the reservoir can be relatively high when the composition that diffuses through the reservoir membrane is continuously removed, as by rubbing, etc. Under these circumstances, the release rate of the composition from the reservoir can follow zero order kinetics. As the concentration gradient declines, however, the release rate of the composition from the reservoir can follow first order kinetics (square root of time).

It will also be appreciated that this mode of operation makes it possible to provide an early burst effect. A relatively large amount of the composition can be deposited from the reservoir onto the animal when use of the device is commenced. This can be followed by the release of material from the reservoir in amounts sufficient to maintain effective concentrations of the material on the animal from day to day as the material is consumed or degraded after it diffuses through the reservoir membrane. This phenomenon is apparent from FIG. 4. Diazinon was rapidly released from the reservoir during the early stage of use of the silicon (SIL) and polyvinyl chloride (PVC1) reservoirs, but the release rate gradually declined to maintenance levels as time progressed.

The animal-treating composition in the reservoir can contain one or more active ingredients capable of producing a variety of effects. Thus, for example, the composition can contain active ingredients capable of producing a killing or repellant effect on insects and parasites, or of interfering with the life cycle of insects and parasites, such as occurs with insect growth regulators. The active ingredient can even produce a deodorant effect on the animal.

The animal treating composition can be in solid or liquid form in the reservoir. When the composition is in a solid form, it is frequently advantageous to include a diluent in the composition in an amount sufficient to facilitate diffusion or flow of the composition from the center of the reservoir to the reservoir membrane to provide a continuous supply of the composition for diffusion to the environment outside the reservoir. Preferably, the composition in the reservoir is in the form of a liquid which may be technical material (neet), a solution, suspension, or dispersion. The active ingredient in the composition is usually incorporated at relatively high loadings. For this reason, the active ingredient is usually incorporated as technical material or in a good solvent for the ingredient, such as in an organic solvent.

The animal treating composition in the reservoir can also include one or more additives to alter the properties of the composition. For example, a surface active agent can be incorporated in the composition in an amount sufficient to maintain the active ingredient in solution or suspension. A surface active agent or other material can also be added to the composition in an amount sufficient to enhance or retard diffusion of the composition through the reservoir membrane. Thus, for example, a small amount of a polymer plasticizer can be added to the composition to enhance diffusion of the composition through the polymeric membrane.

In the preferred embodiment of this invention, the animal treating composition comprises an insecticide capable of killing ectoparasites on range animals, such as cattle. A number of insecticides are commercially available for this purpose. For example, suitable insecticides can be selected from the group consisting of chlorinated hydrocarbons, organophosphates, pyrethroids, and carbamates. Typical of the insecticides within these classes are lindane, methoxychlor, crotoxyphos, dichlorvos, diazinon, dioxathion, chlorfenvinphos, permethrin, fenvalerate, cypermethrin, carbaryl, and bendiocarb. The preferred insecticides for use against the horn fly are the organophosphates, pyrethroids and the carbamates. The organophosphates are particularly preferred because the organophosphates generally have a different mode of action than pyrethroids and therefore may be useful in the management of horn fly populations resistant to pyrethroids.

The active ingredient is incorporated in the animal-treating composition in an amount sufficient to produce the desired effect throughout the period of time that the composition is delivered from the reservoir to the surface of the animal. As previously noted, this delivery period is typically about 120 days to about 160 days. In the case of an insecticide, the active ingredient is employed in an effective amount to produce a killing effect on the ectoparasites likely to afflict the animal. It will be understood that the amount of the active ingredient in the animal treating composition will depend upon the properties of the ingredient and the rate of diffusion of the active ingredient through the membrane of the reservoir.

It has been found that the active ingredient in the reservoir should be in substantial excess of the amount theoretically required, which is that amount which is required to produce the desired effect. An excess of the active ingredient ensures that a concentration gradient can be maintained during the entire delivery period and that an effective amount of the active ingredient will be deposited on the surface of the animal. Preferably, the active ingredient is employed in an amount of at least about two times the amount theoretically required, and especially about 1.5 to about 3 times the amount theoretically required.

In the case of insecticides, the amount of the active ingredient in the reservoir is generally sufficient to provide about 1 mg per day to about 50 mg per day on the neck of the animal. It will be understood that the amount of the insecticide employed will depend upon toxicity. Thus, about 1 mg per day to about 5 mg per day of a pyrethroid are required for effective killing of the horn fly on cattle over a period of about 120 days to about 160 days. About 10 mg per day to about 50 mg per day of an organophosphate are required for a comparable killing effect.

The reservoir membrane is comprised of a rigid or flexible polymeric material. Preferably, the membrane is comprised of a flexible material because the device of the invention can then be easily deformed to fit the animal on which it is placed. The membrane can be formed from a variety of polymeric materials. Typical materials include flexible, permeable reservoirs of polyvinyl chloride, ethylene vinyl acetate, polyolefin, polyurethane, polyamide, methacrylate, and silicone polymers.

Tetrafluorethylene, polyethylene, and polypropylene polymers are less desirable because of their rigidity and lack of sufficient permeability.

The reservoir membrane must be inert to the animal-treating composition. By this it is meant that the membrane does not substantially chemically react with the composition and the membrane is capable of maintaining mechanical integrity for a period substantially longer than the delivery period for the animal-treating composition.

The reservoir membrane must also be permeable to at least the active ingredient in the animal-treating composition, and will generally be permeable to the entire composition. More particularly, the membrane must have sufficient permeability for the active ingredient to diffuse through the membrane at a release rate sufficient to produce the desired effect. The permeability of the reservoir membrane will depend upon the diffusion coefficient of the polymeric material and the thickness of the material. For a polymeric material having a given diffusion coefficient, a thick membrane of the material will provide a lower release rate than a thin membrane of the same material. Suitable polymeric materials are described in the Examples which follow. Other polymeric materials can be selected with a minimum of experimentation. For example, a simple screening method is described in Example 1 below.

The reservoir can be of substantially any shape and should have an internal volume sufficient to hold the animal-treating composition and the reservoir packing material (12 in FIG. 1). Generally, the volume of the reservoir is about twice the volume required to hold the animal-treating composition. This provides ample room for the packing material. The reservoir can have substantially any length, provided that the desired effect is produced when used on an animal. The reservoir will typically have a length of about 6 inches to about 36 inches. Neck bands incorporating the features of this invention can be fabricated in lengths of about 24 inches to about 36 inches for use on cattle. The size and geometric shape of the reservoir can, of course, affect the quantity of the active ingredient that diffuses through the reservoir membrane. Thus, the release rate of the active ingredient should be balanced against the surface area of the membrane and the geometry of the reservoir.

One of the advantages of the device of this invention is that the reservoir can be provided with means for refilling the reservoir with the animal-treating composition. For example, the reservoir can be fitted with an opening which can be sealed, such as with a removable plug or cap, when the device is in use and which can be opened for refilling as required. Similarly, the reservoir can be provided with a septum through which the composition can be injected by means of a syringe. Of course, the device can also be removed from the animal and discarded at the end of the insect infestation season.

The porous packing material in the reservoir continuously wets the inside surface of the reservoir with the animal-treating composition so that at least the active ingredient in the composition is capable of continuously permeating through substantially the entire surface of the polymeric membrane to the outer surface of the reservoir. The packing thus functions as a wicking material. Without the packing, the quantity of the active ingredient released from the reservoir is difficult to control. Specifically, as the composition diffuses through the membrane, the quantity of the composition in the reservoir decreases and the reservoir may be only partially filled. Since only the composition contacting the membrane can permeate out of the reservoir, the effective surface area for diffusion declines, which can result in insufficient amounts of the active ingredient on the animal. The device of this invention alleviates this problem by providing a packing material in contact with the composition and the inside surface of the reservoir to keep the entire inside surface wetted.

The reservoir packing can be comprised of any material that is inert to the animal-treating composition and is capable of providing a wicking action to keep the entire inside surface of the reservoir membrane wetted. Once again, the term inert is intended to mean that the reservoir packing does not substantially chemically react with the composition and the packing is capable of maintaining mechanical integrity for a period substantially longer than the delivery period for the animal-treating composition. The packing material is typically a porous material. Examples of suitable materials include polymers, such as polypropylene; woven and non-woven fabrics, such as felts; particulate inerts; and gels. A preferred material is a porous, braided, polypropylene rope having an external diameter approximately equal to the internal diameter of a tubular reservoir in which the rope is inserted. It will be understood that composite materials can also be employed. For example, polymeric materials can be coextruded to provide a packing material having a central core of relatively high diffusion coefficient and an outer sheath having a different diffusion coefficient. The packing material can thus be tailored to provide the optimum release rate of the animal-treating composition from the reservoir.

The integrity of the polymeric membrane that forms the reservoir must be maintained during use of the device to prevent loss of the animal-treating composition. The membrane is susceptible to weakening caused by abrasion and to puncture caused by foreign objects. The device of the invention is particularly susceptible to these types of hazards and wear when worn by range animals which traverse heavily vegetated areas. In order to protect the reservoir membrane from abrasion and puncture, a sheath (14 in FIG. 1) is provided over the membrane. The sheath also provides additional tensile strength to the membrane in addition to protecting the membrane.

The sheath can be comprised of any material that is inert to the animal-treating composition and that is capable of conducting at least the active ingredient in the animal-treating composition away from the outer surface of the reservoir and for continuously depositing the active ingredient on the surface of the animal. The active ingredient is conducted away from the reservoir membrane by capillary action and substantially without evaporation or volatilization of the active ingredient during the period of time it leaves the reservoir and is deposited on the surface of the animal. Preferably, the sheath is comprised of a material that is non-absorptive of the animal-treating composition, but which, nevertheless, is capable of providing an effective surface for transfer of liquids by capillary action. Examples of suitable materials are polymeric materials, such as nylon, polypropylene, and polyethylene; and textiles, such as cotton. A preferred material is the same material from which the reservoir packing is comprised. Specifically, a hollow braided, porous, polypropylene rope has been found to produce acceptable results.

It will be understood that the sheath can contact the entire outside surface of the reservoir membrane or the sheath can provide intermittent contact sufficient to achieve the indicated results. The latter effect can be obtained, for example, by the use of an open mesh material.

In an alternative embodiment of the invention, the sheath is embedded in the reservoir membrane or is covered with a permeable material. For instance, the reservoir can be comprised of a polymeric membrane having a nylon mesh embedded therein. This configuration can provide the required mechanical strength to the device of the invention without impeding diffusion of the animal-treating composition through the membrane.

The device of this invention can be secured to the animal using any conventional fastening means. An alternative to the tab and loop arrangement shown in FIG. 1, could include a buckle or means for frictionally engaging one end of the device to the other end to prevent unintentional release. When the device of the invention is used as a neck band, it is preferred that the device fit loosely around the neck of the animal.

The device of this invention can be employed to treat animals such as cattle and pets, for example cats and dogs, against a variety of pests, such as flies, lice, mites, ticks, and fleas. The primary target of this invention is the horn fly which afflicts cattle in open range conditions. Mange mites and Lone Star ticks can be simultaneously controlled with insecticides that are effective against the horn fly. Furthermore, an aromatic or scented compound can be employed in the composition in an amount sufficient to produce a deodorant effect after the composition diffuses through the reservoir membrane.

Because of the problem of pyrethroid resistance in the horn fly, alternatives to the controlled-release insecticidal ear tags were explored. In laboratory studies, the rate of release of 5 selected organophosphate insecticides from polymeric reservoirs of 10 different compositions was determined. Based on the results of the laboratory studies, chlorfenvinphos, diazinon, and crotoxyphos were loaded into thin-walled polyvinyl chloride reservoirs and fabricated into neckbands for cattle. In field trials, reservoir neckbands containing chlorfenvinphos, diazinon and crotoxyphos provided 91%, 88%, and 53% control of horn flies, respectively. These tests are summarized in the following Examples.

EXAMPLE 1

Laboratory Studies

Reservoir systems were selected for study as opposed to homogenous monolithic systems for two reasons: (1) a reservoir system should provide a more uniform rate of release, and (2) the reservoir systems are easier to fabricate and test with a variety of OP-polymer combinations without expensive specialized equipment.

Tubing for fabrication of the reservoirs was selected on the basis of availability and to cover a range of anticipated diffusion rates. The 10 tubing samples selected for study are listed in Table 1. All tubing samples were 6.4 mm (0.25 in.) inside diameter.

TABLE 1

LIST OF RESERVOIR TUBING AND WALL THICKNESS OF TUBING USED IN LABORATORY STUDY (1) Polyvinyl chloride (PVC1, 0.8 mm) (Tygon R3606)[a]
(2) Polyvinyl chloride (PVC2, 1.6 mm) (Tygon R3606)[a]
(3) Ethylvinyl acetate shell with polyethylene liner (BL4, 0.8 mm) (Bev-a-Line IV)[b]
(4) Ethylvinyl acetate shell with a crosslinked polyethylene liner (BL5, 0.8 mm) (Bev-a-Line IV)[b]
(5) Polyvinyl chloride shell with a polyester elastomer liner (BLXX, 1.6 mm) (Bev-a-Line XX)[b]
(6) Polyethylene (PE, 1.6 mm) (low density)[b]
(7) Ethyl methacrylate (EMA, 1.6 mm)[b]
(8) Ethylene propylene diene monomer EPDM spheres in a polyethylene matrix (PEL, 1.6 mm) (Santoprene)[b]
(9) Teflon (TEF, 0.8 mm)[b]
(10) Silicone rubber with iron oxide filler (SIL, 1.6 mm), (polydimethylsiloxane)[b]

[a]Source: Norton, Akron, OH 44309, U.S.A.
[b]Source: Thermoplastic Processes, Inc., Stirling, NJ 07980, U.S.A.

The organophosphate insecticides used in the study were selected because of their toxicity to horn flies and their availability as technical compounds in liquid form. The 5 OP's used are shown in Table 2.

TABLE 2

LIST OF ORGANOPHOSPHATE INSECTICIDES USED IN LABORATORY STUDY (1) Crotoxyphos (Ciodrin ®)
(2) Dichlorvos (Vapona ®)
(3) Diazinon (Spectracide ®)
(4) Dioxathion (Delnav ®)
(5) Chlorfenvinphos (Supona ®)

Sample reservoirs were fabricated in duplicate by cutting two 14-cm lengths of each type tubing. A 10-cm length of braided polypropylene cord (6.3 mm dia.) was threaded into each piece of tubing to act as a wick for continuously wetting the inside surface. A tight-fitting glass rod was used to stopper one end of the tubing. From the other end, 1 gram of technical insecticide (liquid) was loaded into the reservoir using syringe and needle. A second piece of glass rod of greater length than the first was then used to seal the reservoir and yet allow ca. 55 cm. to protrude and serve as a handle. The glass rods were pushed toward each other until they were 10 cm. apart. In a similar manner, each insecticide was loaded into each type of tubing, thus providing 100 sample reservoirs consisting of 2 samples of each of 10 types of tubing for each of the 5 insecticides. The reservoirs were held on a wire rack in a horizontal position.

In order to determine the rate of release of insecticides from each reservoir sample, the samples were washed each day by dipping in large screw-top test tubes containing 50 ml of acetonitrile. The glass rod handle was used to insert the sample into its respective washing vial and to provide agitation as the sample was washed for 15 seconds. Samples of the acetonitrile were withdrawn each week and analyzed by HPLC for insecticide content. The acetonitrile in each test tube was changed at the end of week 3, 7, 10, and 13 of the study. The analysis indicated the accumulative quantity of insecticide diffusing from the reservoir. From these data, the weekly rate of release for each insecticide-reservoir system was calculated.

The release rate profiles for chlorfenvinphos, diazinon, crotoxyphos, and dioxathion from the 10-cm length reservoirs are shown in FIGS. 3-6, respectively, for the indicated compositions. Those types of reservoirs tested but not shown in the Figures had no detectable release, or release was of such small quantities as to be impractical for the intended usage.

Because of the high volatility of dichlorvos and degradation in the acetonitrile, data from this compound are not presented. With only a few exceptions, the release rates from the various systems shown in the Figures are rather uniform as could be expected from reservoir systems.

The release rates of chlorfenvinphos ranged from 2 mg/wk to over 30 mg/wk (FIG. 3) for the various reservoirs. The non-uniform release of the PVC1 reservoir was unexpected and unexplainable. The seals around the glass rod at each end did not appear to be leaking, and both sub-samples exhibited this non-uniformity of release. Expectations were for a release rate profile similar to the PVC2 only with a somewhat higher release rate. The SIL reservoirs rapidly reached their stable rate and remained fairly uniform over the 13 week test.

Figure 4:
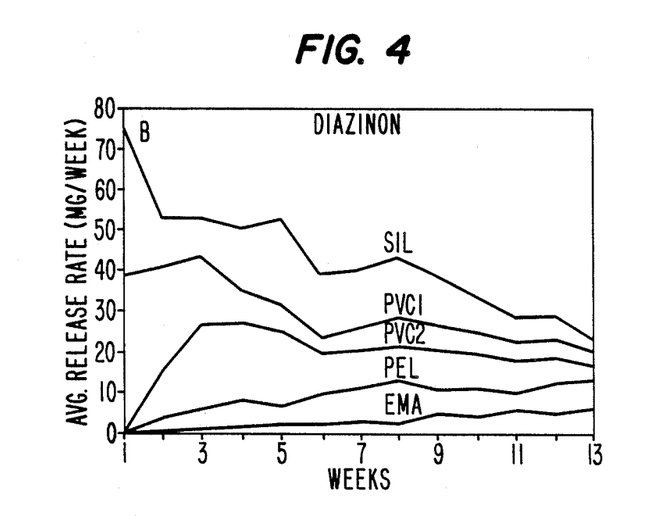
FIG. 4 depicts the release rate of diazinon from reservoirs of five different compositions.

The release of diazinon from the reservoirs ranged from 2 mg/wk for the EMA reservoirs to approximately 30 mg/wk for the PVC1 reservoirs (FIG. 4). The rapid decline in release rate for the SIL reservoir is unexplained.

Figure 5:
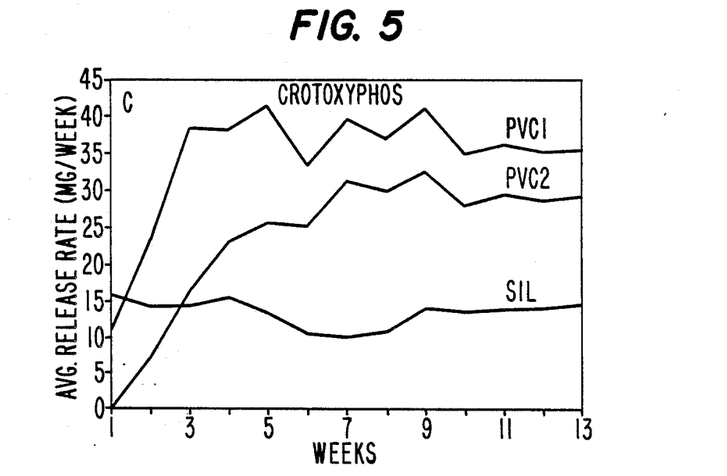
FIG. 5 depicts the release rate of crotoxyphos from reservoirs of three different compositions.
Figure 6:
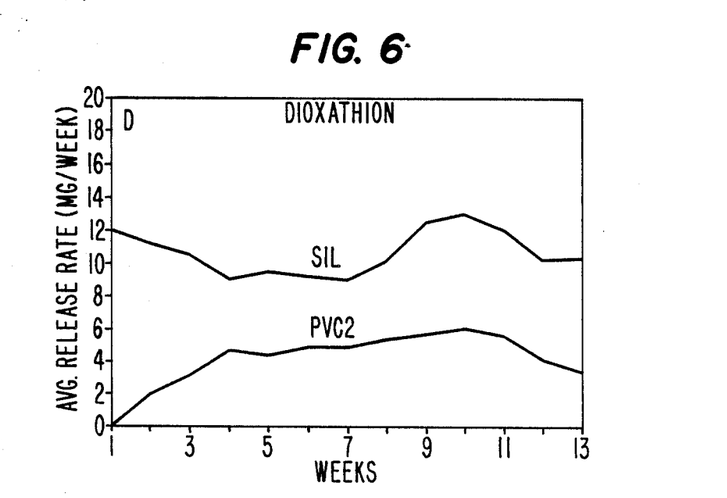
FIG. 6 depicts the release rate of dioxathion from reservoirs of two different compositions.

For crotoxyphos, measurable release rates were observed from only the PVC1, PVC2 and SIL reservoirs (FIG. 5). After requiring approximately 3 weeks to reach their stable level of release, a rate of approximately 35 mg/wk was measured from the PVC1 reservoirs. The PVC2 system released slightly less as could be expected, and the SIL reservoirs released only half that of the PVCs.

Only 2 reservoirs, PVC1 and SIL, showed any release of the dioxathion (see FIG. 6), and the release from these reservoirs was only 5 and 10 mg/wk, respectively.

EXAMPLE 2

Field Studies

Based on the results of the laboratory study, a combination of the thin-wall (0.8 mm) PVC reservoirs with chlorfenvinphos, diazinon and crotoxyphos as the insecticides were selected for field studies of horn fly control on cattle. The systems were fabricated similarly to that used in the laboratory study.

A polypropylene wick was installed in a 60-cm length of the tubing. The reservoir was then threaded into hollow braided polypropylene rope of sufficient length for a neckband on cattle. The reservoir was then loaded with 10 grams of technical insecticide and the ends sealed with a tetrahydrofuran (THF) based PVC cement.

Each of the 3 systems was installed on individual herds of 10 cows each at Camp Stanley, Texas. The number of horn flies on each herd was monitored at 2-week intervals and compared to that on an untreated herd. The results of the field study using the PVC1 reservoirs to deliver chlorfenvinphos, diazinon, and Crotoxyphos are shown in Table 3.

TABLE 3

EFFICACY OF PVC1 RESERVOIR NECKBANDS AGAINST THE HORN FLY

| Weeks post-treatment | Avg. No. of horn flies on herds tested as indicated | | | |
|---|---|---|---|---|
| | Un-treated | Chlorfenvinphos | Diazinon | Crotoxyphos |
| 0 | 1000 | 600 | 600 | 600 |
| 1 | 1000 | 600 | 30 | 450 |
| 3 | 1000 | 50 | 150 | 450 |
| 4 | 1000 | 10 | 100 | 500 |
| 6 | 1000 | 5 | 50 | 500 |
| 8 | 1000 | 0 | 30 | (Terminated) |
| 10 | 500 | 0 | 5 | |
| 12 | 200 | 0 | 10 | |
| 14 | 400 | 5 | 20 | |
| 16 | 1000 | 50 | 60 | |
| 18 | 1000 | 50 | 350 | |
| 20 | 500 | 30 | 250 | |
| Overall Percent Control | | 91% | 88% | 53% |

The crotoxyphos delivery system provided only 53% control of the horn fly population, and the neckbands were removed after only 42 days on the cattle. The chlorfenvinphos and the diazinon delivery systems provided 91% and 88% control of horn flies on the cattle, respectively. The chlorfenvinphos system required somewhat longer than the diazinon system to exhibit control; however, it provided a greater level of control and greater duration of control. The duration of control provided by both these systems approaches that provided by the pyrethroid insecticidal ear tags against non-resistant horn flies. The neckband attachment system resulted in no loss of devices from the animals over the entire study period.

When the neckbands were removed from the cattle, HPLC analysis was used to estimate the quantity of insecticide remaining in 3 randomly selected bands of each type. The mean weekly rate of release for each was calculated to be 183±29 mg, 151±23 mg, and 158±12 mg for crotoxyphos, diazinon, and chlorfenvinphos, respectively. When these values are adjusted from the 60 cm length of the neckband reservoir to the 10 cm length of the reservoirs used in the laboratory study, the mean release rates in the laboratory and field trials were found to be comparable.

In summary, this invention provides an effective, economical alternative to the early method of spraying animals with insecticides to protect the animals against insects and other pests. Similarly, this invention provides an effective alternative to the use of monlithic ear tags to protect the animals against these pests. The delivery system of this invention makes it possible to achieve the sustained release of an animal-testing composition over a prolonged period of time. Because of its mode of operation, the delivery system makes it possible to achieve uniform or variable release rates for the composition depending upon the need for the composition on the animal and in the animal's surroundings. In addition, high loadings of the composition in the delivery device can be achieved, which makes it possible to use active ingredients for prolonged delivery periods, which could not otherwise be achieved in a practical manner with monolithic ear tags. Moreover, the delivery system of the invention can be designed so that there is a relatively low residual insecticide content in the delivery device at the end of a predetermined period of time. It has been found that the device of the invention can be fabricated in the form of neck bands for range animals, and that there is virtually no loss of the neck bands by accidental removal from the animals even under harsh range conditions.

What is claimed is:

1. A device for the controlled, sustained-release of an animal-treating composition onto a surface in contact with said device, wherein the device comprises:
   reservoir means having an inside surface and an outside surface, wherein said reservoir means is comprised of a permeable, imperforate, polymeric membrane;
   a porous packing means in said reservoir means for continuously wetting the inside surface of said reservoir means with said animal-treating composition so that said composition can continuously permeate through said membrane to the outer surface of said reservoir means; and
   a porous sheath means in contact with the outer surface of said reservoir means for continuously conducting away by capillary action the composition that permeates through said membrane to the outer surface of the reservoir means and for continuously depositing said composition onto said surface.

2. The device as claimed in claim 1, wherein the reservoir means is a flexible membrane comprised of a polymeric material selected from the group consisting of polyvinyl chloride, polyolefin, polyurethane, polyamide, methacrylate, and silicon polymers.

3. The device as claimed in claim 1, wherein the packing means is a polymeric material comprised of polypropylene.

4. The device as claimed in claim 1, wherein the porous sheath means is a polymeric material comprised of polypropylene.

5. A method of using the device of claim 1, wherein the method comprises
   attaching said device to an animal, wherein said animal-treating composition in said device contains an active ingredient;
   maintaining a concentration gradient of said active ingredient between said inside surface and said outside surface of said reservoir means so that said active ingredient can permeate through said polymeric membrane of said reservoir means; and removing active ingredient that permeates through said polymeric membrane from said device by contact between said ingredient and said animal.

6. A reservoir neck band for the controlled, sustained release of an insecticide onto the neck of an animal, wherein the neck band consists essentially of
   reservoir means having an inside surface and an outside surface, wherein said reservoir means is comprised of a flexible, liquid permeable, imperforate, polymeric membrane;
   a liquid composition in said reservoir means, wherein the liquid composition comprises an insecticide either neet or in solution in an organic solvent; and wherein the insecticide can diffuse through said membrane, and the insecticide is selected from the group consisting of pyrethroid compounds, organophosphate compounds, carbamate compounds, and mixtures of said compounds, which are insecticidal to horn flies;
   a porous packing means in said reservoir means for continuously wetting the entire inside surface of said reservoir means with said insecticide so that said insecticide is capable of continuously diffusing through said membrane to the outer surface of said reservoir means; and
   a porous sheath means in contact with the outer surface of said reservoir means for continously conducting away by capillary action the insecticide on the outer surface of said reservoir means and for depositing the insecticide onto the neck of the animal, substantially without volatilization or evaporation of the insecticide before the insecticide is deposited on the neck of the animal;
   wherein said neck band is capable of delivering a horn fly killing effective amount of about 1 mg per day to about 50 mg per day of said insecticide to the neck of the animal for a period of about 120 days to about 160 days.

7. The device as claimed in 6, wherein the reservoir means is a membrane comprised of a polymeric material selected from the group consisting of polyvinyl chloride and silicone polymers.

8. The device as claimed in claim 7, wherein the porous packing means and the porous sheath means are each comprised of polypropylene.

9. The device as claimed in claim 7, wherein the insecticide is an organophosphate or a pyrethroid.

10. The device as claimed in claim 7, wherein the insecticide is an organophosphate.

11. The device as claimed in claim 10, wherein the device delivers about 5 mg per day to about 50 mg per day of the organophosphate to the neck of the animal.

12. A method of using the device of claim 6, wherein the method comprises attaching said device to an animal, wherein said animal-treating composition in said device contains an active ingredient;
   maintaining a concentration gradient of said active ingredient between said inside surface and said outside surface of said reservoir means so that said active ingredient can permeate through said polymeric membrane of said reservoir means; and
   removing active ingredient that permeates through said polymeric membrane from said device by contact between said ingredient and said animal.

* * * * *